April 11, 1939.  S. B. MILLER  2,154,345
POULTRY WATERER
Filed Sept. 13, 1935  2 Sheets-Sheet 1
Fig. 1.
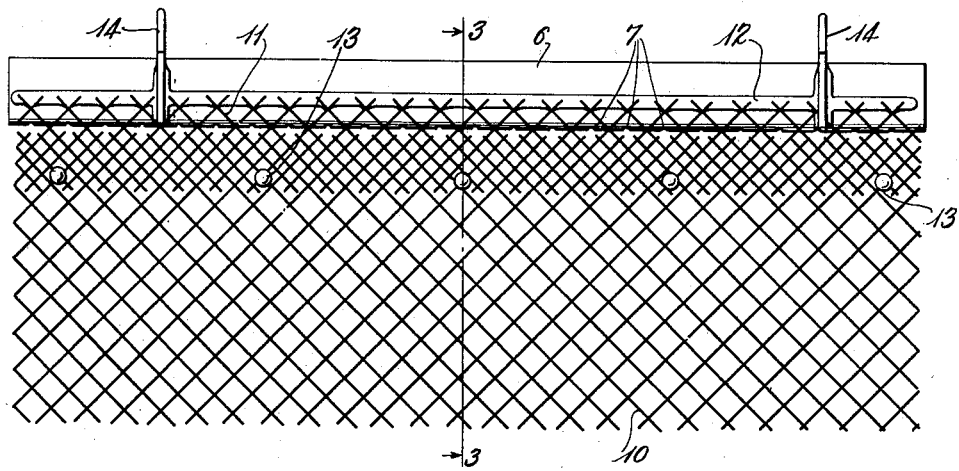
Fig. 2.
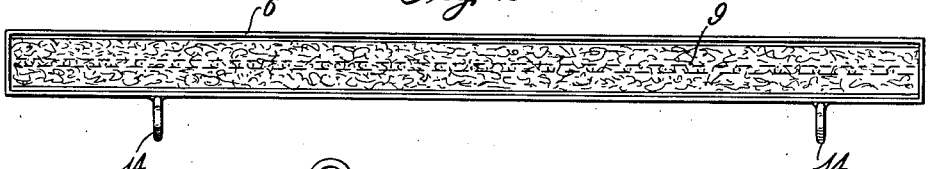
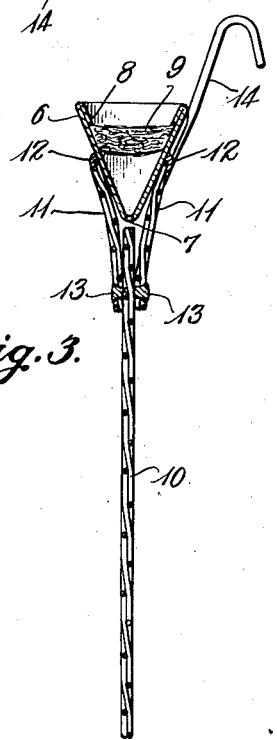
Fig. 3.
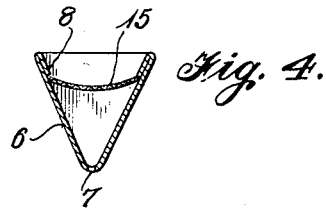
Fig. 4.
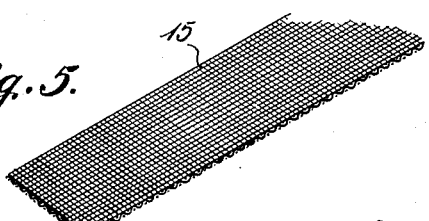
Fig. 5.
Inventor
Stanley B. Miller
By Bacon & Thomas
Attorneys April 11, 1939. S. B. MILLER 2,154,345
POULTRY WATERER
Filed Sept. 13, 1935 2 Sheets-Sheet 2
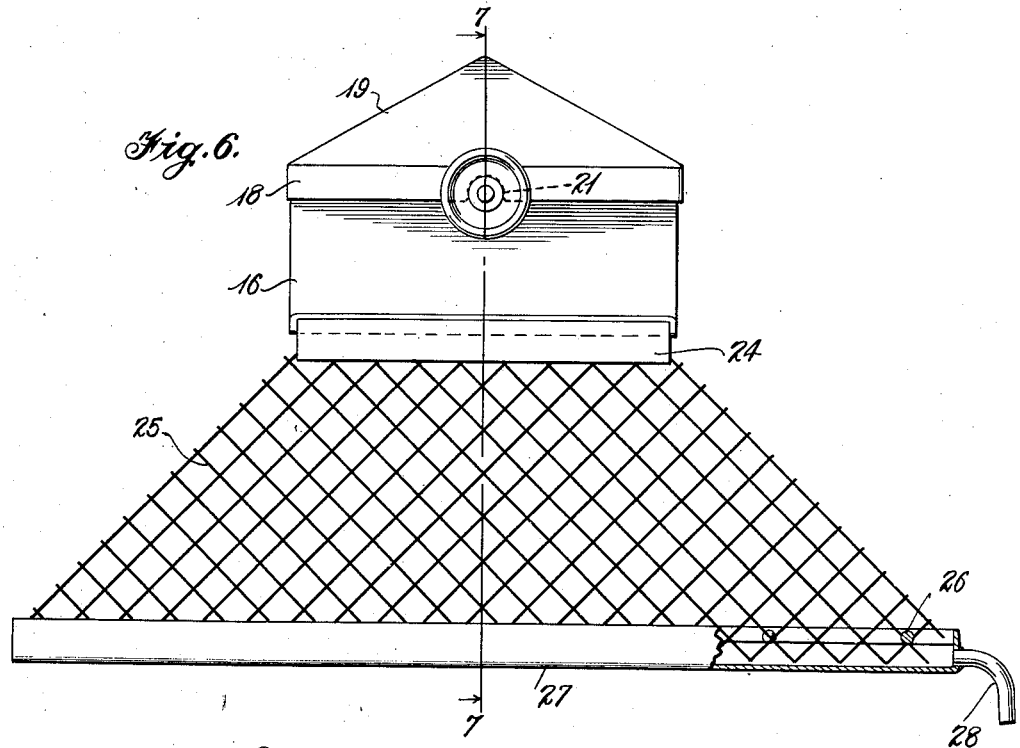
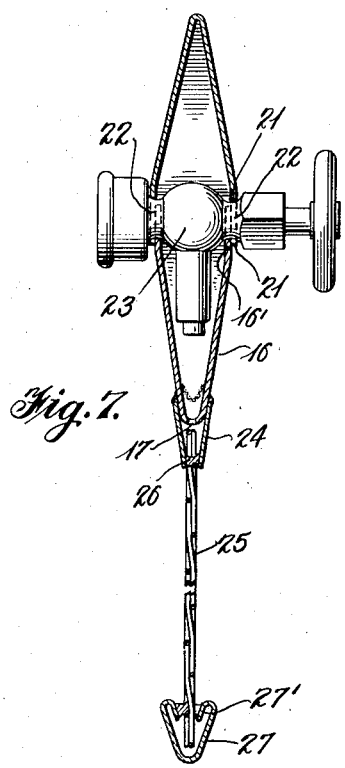
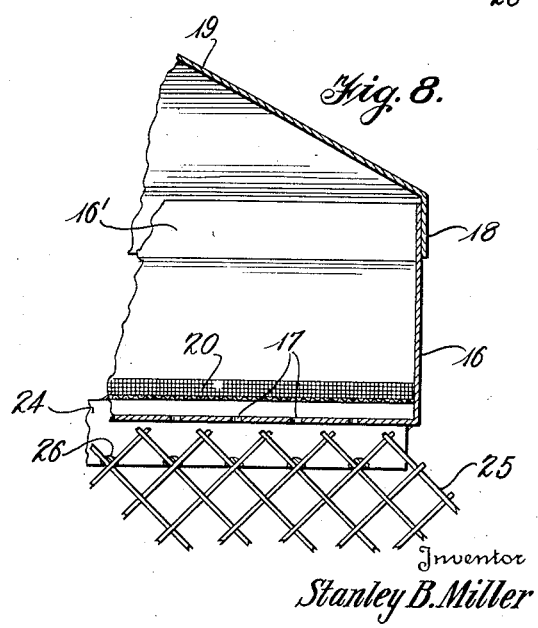
Inventor
Stanley B. Miller
By Bacon & Thomas
Attorneys Patented Apr. 11, 1939

2,154,345

UNITED STATES PATENT OFFICE 2,154,345

POULTRY WATERER

Stanley Burrill Miller, Morgantown, W. Va.

Application September 13, 1935, Serial No. 40,481

6 Claims. (Cl. 119—72)

This invention relates to new and useful devices for supplying sanitary and uncontaminated water or other liquid to chicks, chickens, birds or other fowls, and for conditioning the air, and preventing the spread of disease, in brooders, coops or ranges.

The primary object of the invention is to provide means for supplying pure aerated and oxygenated water or other liquid to such fowls by impeded flow of slow streams, or suspended drops or segregated portions, of water or other liquid, on a mesh or screen or other suitable material in effect producing individual drinking cups and preventing use of polluted water from a common pool or container.

Further objects of the invention are to provide a device which, when employed in connection with breeding and housing means for such fowls, will effect a humidifying and conditioning of the air in the brooder or other enclosure, and, by trickling flow and movement of sparkling streams and drops, attract the fowls to its use and stimulate their activity and exercise, eliminating the necessity for frequent cleaning and refilling of common water containers, and preventing contamination of water supply and communication of disease among such fowls.

Other objects and advantages of the invention will be apparent during the course of the following description.

In the accompanying drawings forming a part of this specification and in which like numerals are employed to designate like parts throughout the same:

Figure 1 is a side elevational view of the poultry watering and air conditioning device embodying this invention;

Figure 2 is a top plan view of the device disclosed in Fig. 1;

Figure 3 is a vertical sectional view taken on line 3—3 of Fig. 1;

Figure 4 is a detail, vertical sectional view, illustrating a modified form of the trough structure;

Figure 5 is a detail, fragmentary, perspective view of a strainer or purifying screen employed in the modification disclosed in Fig. 4;

Figure 6 is a side elevational view of a further modified form of poultry watering and air conditioning device;

Figure 7 is a vertical, sectional view taken on lines 7—7 of Fig. 6; and

Figure 8 is an enlarged detailed view, partly in section, of the device shown in Figs. 6 and 7.

In the drawings, wherein for the purpose of illustration are shown preferred embodiments of this invention, the reference character 6, in Figs. 1 to 3, inclusive, designates a V-shape trough formed of suitable sheet material, such as sheet metal. This trough has formed in the apex of the V, or in its bottom edge, a longitudinal series of relatively small apertures 7, which will slowly feed water, or the like, from the bottom of the trough 6. The upper marginal edge of the trough is folded inwardly to form a retaining flange 8. In Figs. 2 and 3, there is disclosed a felt or other fibrous pad 9 which is positioned within the trough and maintained therein by means of the inturned flange 8. This felt or fibrous pad is employed to filter out foreign particles from the water supplied to the trough and evenly distribute and regulate the flow of water through the apertures and over the mesh or screen.

Depending from the bottom of the trough 6, in alignment with the longitudinal series of apertures 7, is a wire mesh screen section 10, over which the water or other liquid is distributed or suspended for use. This screen is held in place by opposed strips of plain or perforated material or mesh 11 which are arranged on opposite sides of the trough 6 and the upper portion of the screen section 10. These strips 11 are soldered at 12 to the outer side surfaces of the trough 6, and are spot soldered or otherwise attached at 13 to the opposite sides of the screen section 10. It will be noted that these strips 11 maintain the screen section 10 in alignment with the apertures 7 and suitably spaced from these apertures at its upper edge so as to catch and distribute the water in flow and suspension on the screen 10.

Soldered to one wall of the trough 6 are a plurality of wire hook members 14 which are employed for suspending or attaching the device to a suitable support.

Figs. 4 and 5 are intended to illustrate a slight modification. In Fig. 4, the trough 6 is illustrated as being provided with a fine mesh wire screen 15 which functions in the same manner as the felt insert 9 disclosed in Figs. 2 and 3.

In Figs. 6 to 8, inclusive, the reference character 16 designates a form of trough which is formed of sheet metal, or the like, and is of substantially V-shape in cross section. The bottom or lower edge of this trough is provided with a longitudinal series of relatively small apertures 17. The top margin 16' of the trough is bent with respect to the main body portion of the trough so that opposite sides of the same are arranged in parallelism. This marginal flange 16' accommodates a marginal flange formed on the edge of a cap 19 which is employed for closing the top of the trough 16. A fine wire mesh screen, or other suitable material 20 is positioned within the trough, adjacent the bottom thereof, to screen out foreign matter from the water supplied to the trough, and to distribute and regulate the flow of water from the trough over the screen or other distributing device.

The longitudinal marginal portion 16' and flange portion 18 of the trough and cap, respectively, are notched or cut away at 21 to accommodate the reduced neck portions 22 of a valve device 23. This valve device is intended to be connected to a suitable source of water supply and functions to supply the trough 16 with a regulated flow of water.

Suitably soldered, or otherwise attached, to the longitudinal side walls of the trough 16 are strips of sheet metal 24. These members 24 are employed to suspend from the bottom of the trough a section of wire mesh screening 25. It will be noted by inspecting Fig. 6 that this section of wire mesh screening or the like is of substantially triangular form with the apex portion of the same presented to the bottom of the trough 16 and held in spaced relation to the apertures 17 by the strips of sheet metal 24 to which the section of wire mesh screening is soldered at 26. It will be appreciated that the substantially triangular shape of the wire mesh screen section 25 permits a trough to be used which is of less length than the maximum length of the screen section.

A gutter or drain trough 27, of substantially V-shape in section, is suitably soldered to the lower edge of the screen section 25 and functions to receive and carry away the unconsumed water which trickles down the strands of the screen section 25, and prevents use of contaminated water. It will be noted by inspecting Figs. 6 and 7 that the top edges 27' of the gutter or trough 27 are curled inwardly to provide a restricted entrance or throat for this gutter. This restricted throat in combination with the bottom edge portion of the screen section 25 functions to prevent the chickens, or the like, which are using this watering device, from obtaining water from the gutter. A discharge spout 28 is connected to one end of the gutter 27 to drain off the water collected in the gutter.

One particular use for the device disclosed in the several figures is to provide unpolluted, aerated drinking water for chicks confined in battery brooders, and to attract them to its use and stimulate their activity and exercise. It will be appreciated, however, that these devices constitute sanitary drinking water supplying means for any form of cage, coop or range for any age, size or kind of fowl. The form of device shown in Fig. 1 is, due to the provision of the supporting hooks 14, especially adapted for being removably suspended from the wire screening side walls of the various sections of a battery brooder or container. It will be appreciated, however, that hooks, or other supporting means, may be provided for the trough shown in Fig. 6 for adapting this modified form of watering device for the same use as that described in connection with the form shown in Fig. 1. The watering device disclosed in Fig. 6 is probably better adapted for being suitably suspended from the ceiling of a coop, or the like, so that it will be positioned in spaced relation to the side walls whereby both side faces of the screen section 25 will be available for drinking purposes. It will also be appreciated that the variable height of the screen sections of the two different types of watering devices make the said devices suitable for use by chicks or fowls of all ages, sizes or kinds. The screen or other distributing device sections 10 and 25 function to effect a very gradual feeding of fresh, uncontaminated water in the form of drops or small streams which will flow downwardly changing their directions of flow at angles in zigzag or tortuous paths.

Specific water supplying mechanism is disclosed in connection with the form shown in Fig. 6. This form also discloses a discharge or disposal gutter 27 for taking care of the water which is not consumed during its passage over the screen section. It will be understood that any similar or suitable form of water supply and unconsumed water disposal means are to be provided for the form of watering device disclosed in Fig. 1.

The presenting of aerated drinking water to chickens, chicks or the like in the form of drops or fine streams on the wire screen sections provides individual drinks for the fowls and eliminates any possible contamination of the drinking water. The attractive presentation of clean and sparkling water encourages its use and affords activity and exercise, thus averting the natural tendency of chicks to pick feathers and flesh of one another.

The suspension of water in the form of small streams or drops on the screen sections will effect a conditioning or humidifying of air circulating through the coops or sections of the brooders, with the result that the chicks are provided with a healthier supply of air for breathing purposes.

It is to be understood that the forms of this invention herewith shown and described are to be taken as preferred examples of the same, and that various changes in shape, size, and arrangement of parts may be resorted to without departing from the spirit of the invention or the scope of the subjoined claims.

Having thus described my invention, I claim:

1. A poultry watering device of the type described, comprising a trough having a series of apertures in its bottom, a section of liquid conveying wire mesh, and a strip of material attached to each side wall of said trough, said strips converging downwardly and being attached to said section of mesh at points spaced from the upper edge thereof to suspend said section with its upper edge portion free and in vertical alignment with said series of apertures.

2. A poultry watering device of the type described comprising a V-shaped trough having a series of small apertures in its bottom and a marginal flange at its upper edge, a cap for closing the top of said trough having a bottom marginal flange to fit the flange of said trough, said marginal flanges being notched to collectively form opposed openings, a valve device for supplying drinking water to the trough positioned in the enclosure formed by said trough and cap and projecting from opposite sides thereof through said opposed openings, a section of mesh screen, means for attaching the screen to said trough so that it will depend in alignment with said series of apertures, and a V-shaped gutter having a restricted opening and secured to the lower edge of said section of screen for collecting unconsumed water from said screen.

3. A poultry watering device of the type described, comprising a liquid receptacle having a series of discharge apertures formed therein, said receptacle having a marginal flange at its upper edge, a cap for closing the top of said receptacle having a bottom marginal flange to fit the flange of said receptacle, said marginal flanges being notched to collectively form opposed openings, a valve device for supplying drinking water to the receptacle positioned in the enclosure formed by said receptacle and cap and projecting from opposite sides thereof through said opposed openings, a section of mesh material, means for attaching the material to said receptacle so that it will depend in alignment with said series of apertures, and a gutter having a restricted opening adapted to receive the lower edge of said section of material for collecting unconsumed water from said material.

4. A portable poultry watering device of the type described, comprising a trough having a series of apertures formed at its bottom, hook-like members secured to said trough to suspend said watering device from a support, a section of liquid conveying wire mesh, and means for connecting said section of wire mesh to said trough so that the upper edge thereof will depend in alignment with said series of apertures.

5. A poultry watering device of the type described, comprising a trough having a series of apertures in its bottom, a section of liquid conveying wire mesh, a strip of material attached to each side wall of said trough, said strips converging downwardly and being attached to said section of mesh at points spaced from the upper edge thereof to suspend said section with its upper edge portion free and in vertical alignment with said series of apertures, and means provided on said trough for suspending the watering device from a support.

6. A poultry watering device of the type described, comprising a trough having a series of apertures formed at its bottom, hook-like members secured to and extending above said trough to suspend said watering device from a support, a section of liquid conveying wire mesh, and a strip of material attached to each side wall of said trough, said strips converging downwardly and being attached to said section of mesh whereby to suspend said section with its upper edge portion free and in vertical alignment with said series of apertures.

STANLEY BURRILL MILLER.